(No Model.)

B. H. BRAND.
HARNESS SADDLE.

No. 247,604. Patented Sept. 27, 1881.

Attest.
Percy Knight
L. M. Hopkins

Inventor.
B. H. Brand
By Knight Bros.
Attys.

UNITED STATES PATENT OFFICE.

BERNETT H. BRAND, OF CINCINNATI, OHIO.

HARNESS-SADDLE.

SPECIFICATION forming part of Letters Patent No. 247,604, dated September 27, 1881.

Application filed August 16, 1881. (No model.)

*To all whom it may concern:*

Be it known that I, BERNETT H. BRAND, of Cincinnati, Hamilton county, Ohio, have invented a new and useful Improvement in Harness-Saddles, of which the following is a specification.

My invention relates to a new and useful construction of tree for harness-saddles, which enables it to be readily conformed to the back of the animal with which it is designed to be used, and which also relieves the animal from violent jolts and jars incident to travel over rough or broken pavements, &c.

Figure 1:
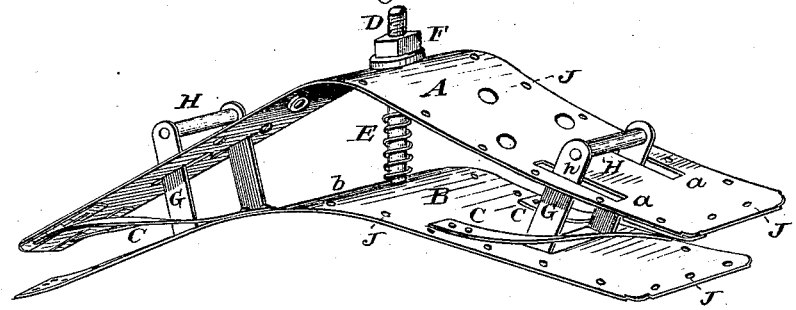
Figure 2:
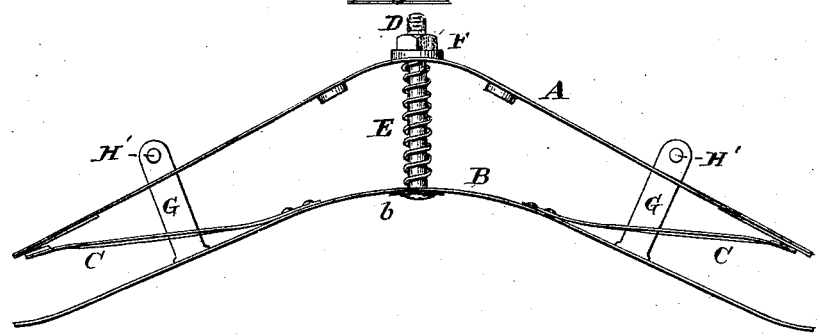
Figure 3:
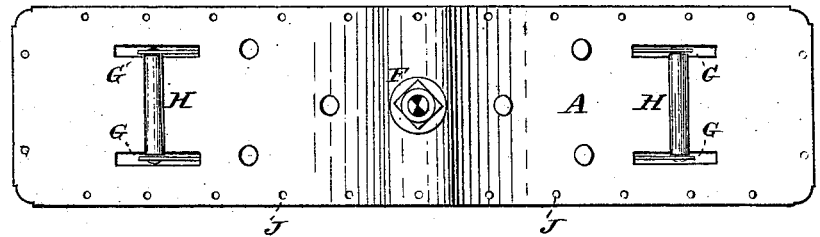

In the accompanying drawings, Figure 1 is a perspective view of a tree embodying my improvement. Figs. 2 and 3 are respectively rear and top views of the same.

A is the crown-plate, preferably of malleable cast-iron. B is the pad-plate, preferably of sheet-steel. Of these plates, plate A is rigid, while plate B, on the contrary, is moderately pliable and elastic. Springs C, which are attached to top of plate B, uphold plate A at some distance from plate B, and also tend to flatten or depress the middle bend, $b$, of plate B.

A post, D, that rises from the middle of plate B and extends through a hole in plate A, is enveloped by a helical spring, E, which coacts with springs C in maintaining a flat condition of plate B and its separation from plate A. The post D, being screw-threaded at its upper portion, receives a nut, F, which, being screwed down or up, operates to either elevate or depress the ridge of plate B, and to thus adapt it to fit the back of the animal with which it is to be employed. This capacity for ridge adjustment is especially valuable for high-backed horses and mules, as by proper elevation of the pad-plate ridge all danger of galling the animal's back is avoided, and even animals with galled backs may be more quickly cured when using one of my saddles than with those of the common forms.

Rising obliquely outward from the pad-plate are two pairs of cheeks, G, which, extending through slots $a$ in plate A, constitute journal-bearings for rollers H. These cheeks serve as stays to prevent lateral sway of the crown and pad plates relatively to each other, and, in conjunction with said rollers and the surface of the crown-plate, do duty as keepers for the back-strap. The tree is padded on the under side of the pad-plate and bound or sheathed in leather to suit the taste and judgment of the saddler.

J represents holes for the stitching or riveting by which the padding and covering are attached.

The roller H is preferably a sleeve rotating freely upon pin $h$, riveted to the stays G; or I may use a simple bar, as at H', Fig. 2.

I claim as new and of my invention—

The combination, in a harness-saddle tree, of rigid crown-plate A and elastic pad-plate B, central post, D, nut F, springs C E, and the stays G, occupying slots $a$ in plate A, and connected outside of said plate by a roller or keeper, H.

In testimony of which invention I hereunto set my hand.

BERNETT H. BRAND.

Attest:
GEO. H. KNIGHT,
SAML. S. CARPENTER.